July 13, 1954     A. H. LLOYD ET AL     2,683,607

BAR CHUCK

Filed April 13, 1953

INVENTORS
ARTHUR HAROLD LLOYD &
DONALD RAYMOND SMITH
BY
Mawhinney & Mawhinney
ATTORNEYS.

Patented July 13, 1954

2,683,607

UNITED STATES PATENT OFFICE 2,683,607

BAR CHUCK

Arthur H. Lloyd and Donald Raymond Smith, Coventry, England, assignors to Alfred Herbert Limited, Coventry, England Application April 13, 1953, Serial No. 348,398

5 Claims. (Cl. 279—59)

This invention relates to a collet or a collet-type of bar chuck for a machine tool.

The main object of the invention is to provide, in a very simple manner, for the gripping portions of the collet always to be parallel to the work bar, tool shank or the like.

A further object is to provide separate gripping members which are guided for axial and radial movement in longitudinal slots, being held in sliding engagement with an external, supporting, frusto-conical surface, supported by the spindle for rotation therewith, by means of a spring-pressed ring having an appropriate engagement with the axially-inner ends of the gripping members, and by means of a locating flange at the axially-outer ends of the gripping members.

A preferred form of collet, according to the invention, includes a tubular portion, supported by the spindle for rotation therewith, which terminates internally with the supporting, frusto-conical surface and which houses a coacting sleeve portion having longitudinal guiding slots in it respectively receiving the gripping members, while the spring ring, disposed round the sleeve portion, has a supporting chamfered engagement with the axially-inner ends of the gripping members whereby to press the latter against the frusto-conical surface and against the locating flange, which is axially adjustable.

Figure 1:
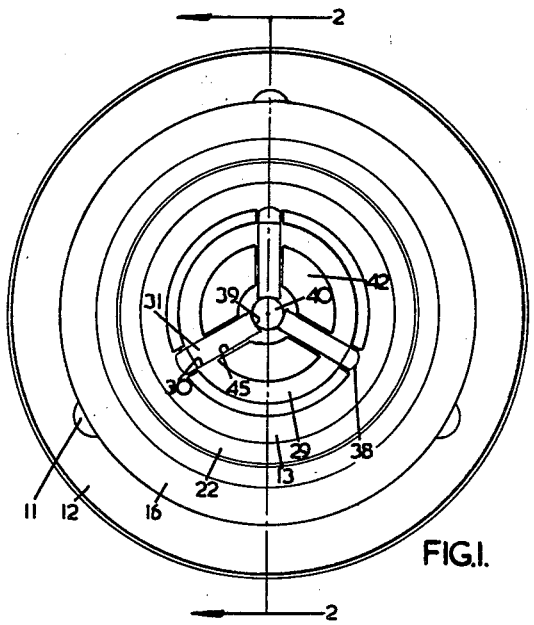
Figure 2:
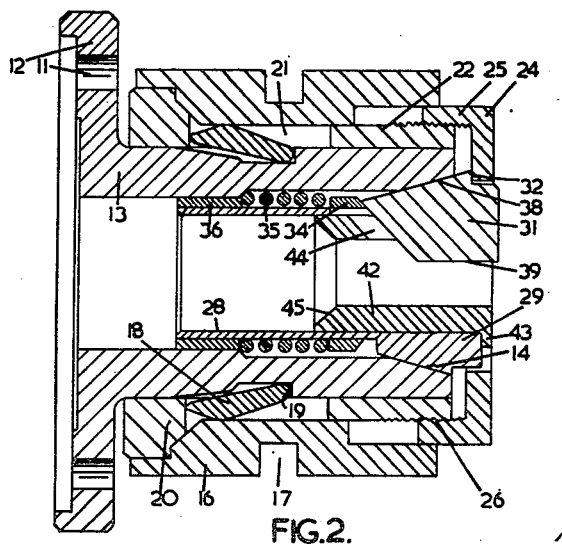

For a better understanding of these and other objects and advantages of the invention attention may be directed to the following description, in which reference is made to the accompanying diagrammatic drawings, wherein:

Figure 1 is a front view of one form of collet-type chuck according to the invention, but with the locating flange omitted, the collet supporting a work bar; and Figure 2 is a section of the chuck on the line 2—2 of Figure 1, showing the collet in the closed position but omitting the bar.

Figure 2 includes a known form of toggle-mechanism for operating the chuck but it should be understood that the invention is in no sense restricted in this respect.

Fast with the spindle of the machine tool (for example, secured by bolts passing through holes 11 in the flange 12) is a tubular spindle portion 13 which terminates at the front end with a diverging, frusto-conical surface 14. 16 represents the collet-actuating sleeve provided with an external groove 17 to receive a striking fork or the like, the sleeve being moved to the right (Figure 2) to open the collet. The so-called toggles 18 interact between a shoulder 19 on the outer surface of the spindle portion 13 and between abutments 20 at the adjacent ends of slots 21 in a sleeve 22 which is slidably mounted on the outer surface of the spindle portion 13. 24 represents an axially-movable flange which is fast with the sleeve 22. As usual, the flange 24 has a cylindrical portion 25 provided with a screw-threaded engagement 26 with the sleeve 22 to allow of adjusting for the diameter of the work bar, after which the flange 24 is locked to the sleeve 22 in any convenient way.

In the present instance a coacting sleeve portion 28 is provided in the bore of the spindle portion 13, this sleeve portion having at its forward end an external frusto-conical surface on a guiding part 29. The guiding part is provided with as many longitudinally-extending slots 30 as there are gripping members 31, only three of the latter being shown in the present instance. The gripping members are recessed as shown at 32 to engage the inner face of the axially-movable flange 24.

The axially-inner ends of the gripping members 31 are chamfered to engage a corresponding chamfer on a ring 34 which is pressed in the disengaging direction by means of a compression spring 35 reacting against a ring 36 fixed to the sleeve portion 28. The spring 35 and ring 34 are disposed in an annular clearance space between the ends of the sleeve portion 28 and the surrounding spindle portion 13.

Thus, the gripping members 31 are at all times supported and maintained with their radially-outer surfaces 38 in sliding engagement with the frusto-conical surface 14.

Preferably the radially-outer surfaces of the gripping members are rounded to a smaller radius than that of the frusto-conical surface 14, so as to ensure line contact between the two, the radius of the outer surfaces of the gripping members being very exaggerated at 38 in Figure 1.

In a rather similar manner, the radius of the radially-inner edge 39 (shown very much exaggerated in Figure 1) of each gripping member is equal to or even slightly greater than that of the maximum diameter of the bar 40 with which the gripping members are to deal, so that, in the case of a bar of less diameter, line contact will again be ensured.

The gripping surfaces 39 are, of course, parallel to one another.

The drawings also show a bush 42 located in one direction by a flange 43 which is inserted in the sleeve portion 28 and provided with slots 44 to receive the gripping members. The axially-inner end of the bush is chamfered, as shown at 45, to assist in guiding a new bar into the collet, the bush blocking up what would otherwise be spaces between the gripping portions 31 into which the bar end might pass.

It will be understood that, in the case of a collet-type of bar chuck having an actuating ball mechanism instead of the toggle mechanism shown in the drawings, the usual axially-slidable collet sleeve, keyed to the spindle, provides the frusto-conical supporting surface 14 for the gripping members 31. The adjustable locating flange 24 is, in this case, fast with the spindle.

What we claim as our invention and desire to secure by Letters Patent of the United States is:

1. For a machine tool spindle, a collet including a tubular portion supported for rotation with the spindle, said tubular portion terminating internally at its outer end with a diverging frusto-conical surface, a number of separate gripping members, a sleeve portion housed in said tubular portion and provided adjacent said frusto-conical surface with longitudinal slots to respectively receive and guide said gripping members, said sleeve portion having annular clearance from the tubular portion between its ends, a spring-pressed ring in said annular clearance having a chamfered engagement with the axially-inner ends of said gripping members to press the latter against said frusto-conical surface, and an axially-adjustable flange engaging the axially-outer ends of the gripping members.

2. A machine tool collet, according to claim 1, in which the gripping members in an endwise view are curved at their radially-outer surfaces to a smaller radius than that of the frusto-conical surface, to provide line engagement between the coacting surfaces.

3. A machine tool collet, according to claim 1, in which the inner surface of each gripping member is curved to a radius which is not less than that of the maximum diameter to which the gripping members are to open.

4. A machine tool collet, according to claim 1, having mounted in the bore of said sleeve portion a bush with a chamfered inner end, the bush being slotted to receive the radially-inner portions of the gripping members.

5. A bar chuck, according to claim 4, in which the bush is of a size to provide protection against the ingress of chips into the mechanism of the collet.

References Cited in the file of this patent

UNITED STATES PATENTS

| Number | Name | Date |
|---|---|---|
| 1,343,795 | Smith et al. | June 15, 1920 |

FOREIGN PATENTS

| Number | Country | Date |
|---|---|---|
| 77,369 | Germany | Sept. 27, 1893 |